United States Patent [19]

Huber

[11] 3,730,535

[45] May 1, 1973

[54] CARTRIDGE LOCKING MECHANISM

[75] Inventor: William B. Huber, Park Forest, Ill.

[73] Assignee: Motorola, Inc., Franklin Park, Ill.

[22] Filed: Apr. 23, 1971

[21] Appl. No.: 136,923

[52] U.S. Cl. ....................274/4 B
[51] Int. Cl. ....................G11b 25/06, G11b 5/00
[58] Field of Search....................274/4 B, 11 B; 179/100.2 Z; 226/89

[56] References Cited

UNITED STATES PATENTS

| | | | |
|---|---|---|---|
| 3,485,500 | 12/1969 | Loeschner et al. | 274/11 B |
| 3,492,005 | 1/1970 | Veno et al. | 274/4 B |
| 3,603,596 | 9/1971 | Eash | 274/4 B |
| 3,221,963 | 12/1965 | Andersen | 274/4 F |
| 3,431,367 | 3/1969 | Nickl | 274/4 F |

FOREIGN PATENTS OR APPLICATIONS

| | | | |
|---|---|---|---|
| 32,268 | 8/1967 | Japan | 274/4 B |

*Primary Examiner*—Harry N. Haroian
*Attorney*—Vincent J. Rauner and R. J. LaPorte

[57] ABSTRACT

A cartridge locking mechanism for a tape player includes a roller arm mounted for pivotal movement on a first mounting post and a bistable spring arrangement coupled between the roller arm and a second mounting post to operate the roller arm between two stable positions and to retain the mechanism in a mounted condition. A leaf spring connected to the roller arm extends into a cartridge receiving tunnel of the tape player for deflection by a cartridge inserted thereinto. Deflection of the leaf spring snaps the bistable spring arrangement from a first to a second stable state causing the roller arm to engage and be received in a notch in the side wall of a cartridge to removably secure the latter in the tunnel.

13 Claims, 4 Drawing Figures

INVENTOR:
WILLIAM B. HUBER
BY: Ronald J. LaPorte
ATTY.

INVENTOR:
WILLIAM B. HUBER
BY: Ronald J. LaPorte
ATTY.

CARTRIDGE LOCKING MECHANISM

BACKGROUND

This invention relates generally to cartridge type tape players which include locking mechanisms for securing a cartridge therein and more particularly to a cartridge locking mechanism for use in a tape player adapted to receive a cartridge having a notch or recess formed along a side wall thereof.

It is desirable in a tape player wherein cartridges are inserted for playback to include means for firmly positioning the cartridge in the player with the tape therein held against apparatus for driving the tape through the cartridge and for playing the tape.

While a variety of such mechanisms are used for securing tape cartridges in tape players, many are complex in design and operation, and/or difficult to assemble and expensive to produce.

SUMMARY

Accordingly, it is a primary object of the present invention to provide in a cartridge type player, a new and improved locking mechanism for removably securing a cartridge in the player.

It is another object of the present invention to provide a mechanism in a cartridge type tape player for removably securing therein a cartridge having a notch or recess formed along a side wall thereof.

It is yet another object of the present invention to provide a cartridge locking mechanism of the type described heretofore which is effective in operation, easily assembled and relatively inexpensive to produce.

Briefly, a preferred embodiment of the cartridge locking mechanism according to the invention comprises a leaf spring projection which extends from a pivotally mounted roller carrying arm into the cartridge receiving tunnel of a tape player housing, in the path of a cartridge received therein. An overcenter or bistable spring arrangement including a coil spring and a pin insert are coupled to a free end of the roller carrying arm. When the overcenter spring arrangement is in a first stable state, the roller is maintained out of the cartridge receiving tunnel. Upon insertion of a cartridge into the tunnel, an inclined corner of the cartridge engages the leaf spring to bend or deflect the latter with the spring riding along the cartridge side wall. Substantially at the time the leaf spring is engaging a flat surface of the cartridge side wall, sufficient force is provided against the leaf spring to cause the overcenter spring arrangement to snap to its second stable position, forcing the roller carrying arm to be pivoted. The latter motion moves the roller into engagement with the flat portion of the side wall of the cartridge. Continued insertion of the cartridge causes the roller to snap into the notch provided in the cartridge side wall.

Removal of the cartridge from the cartridge receiving tunnel forces the roller from the notch. Further withdrawal of the cartridge from the tunnel permits the leaf spring to assume its original position, whereby the overcenter spring arrangement snaps back to its first stable position, driving the roller out of the cartridge tunnel and from the path of the cartridge.

The locking mechanism is easily assembled and mounted on the side wall of a tape player chassis on a pair of spaced mounting posts provided thereon. The coil spring of the overcenter of bistable arrangement serves both to maintain the components of the locking mechanism assembled in snap-together fashion without the need for fastener devices such as bolts, screws and the like, as well as to provide the necessary force to snap the overcenter spring arrangement to its two stable states during the insertion and withdrawal of a cartridge in the player.

DETAILED DESCRIPTION

Figure 1:
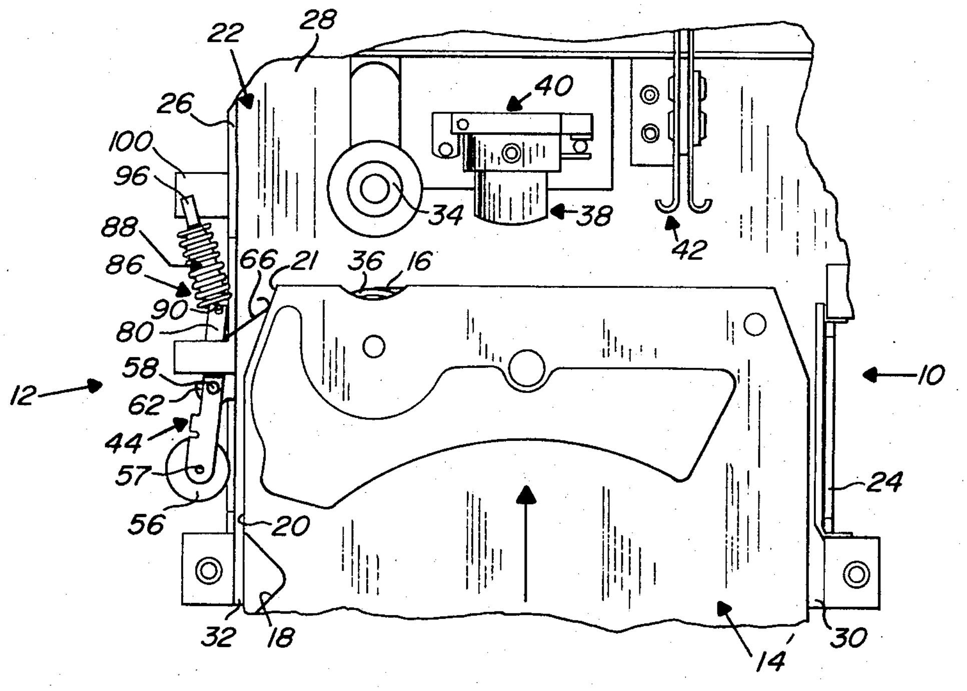
FIG. 1 is a bottom plan view of a cartridge type tape player incorporating a cartridge locking mechanism according to the invention.
Figure 2:
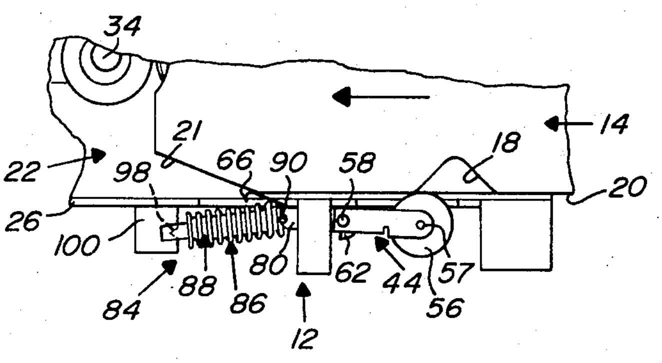
FIGS. 2 and 3 are fragmentary bottom views of the cartridge player of FIG. 1, illustrating the operation of the cartridge locking mechanism during the insertion of a cartridge into the player.

Referring now to the drawings in greater detail wherein like numerals are employed throughout the various views to designate similar parts, there is illustrated in FIG. 1 a cartridge type tape player 10 in which a locking mechanism 12 according to the invention, is employed.

The tape player 10 is adapted to receive and play a tape cartridge 14 of the conventional type, having a recorded, multi-track tape 16 mounted therein and a notch or groove 18 formed along a side wall 20 thereof. The side wall 20 likewise includes at the leading end of cartridge 14, an inclined section 21.

The tape player 10 includes a cast metal housing or chassis 22 having a pair of side walls 24, 26 interconnected by a wall 28 to form a cavity or tunnel 30 having an open end 32 through which the cartridge 14 is received.

Mounted on wall 28 of chassis 22, in communication with tunnel 30, is a capstan shaft 34 against which a pressure roller 36 mounted in the tape cartridge and over which the tape 16 passes, is pressed upon insertion of the cartridge into tunnel 30. The capstan shaft is driven in the usual manner by a motor and pulley arrangement (not shown) to move the tape 16, sandwiched between the capstan shaft and pressure roller, through cartridge 14 past a magnetic tape head 38 also mounted on the wall 28 of chassis 22 in communication with tunnel 30.

The magnetic tape head 38 is mounted on wall 28 by means of a mounting bracket assembly 40, designed to permit movement of the tape head in a plane adjacent the tape 16 in a direction transverse the movement of the tape for the purpose of selectively playing certain ones of the various tracks thereon. Apparatus (not shown) is also provided in tape player 10 to position automatically the tape head with respect to the various tape tracks in response to the detection by contact set 42, mounted on base wall 28 of chassis 22, of a conductive strip (not shown) on the magnetic tape.

The cartridge locking mechanism 12 according to the invention is mounted on a side wall 26 of the chassis of tape player 10, adjacent and extending parallel to the notched or grooved side wall 20 of the tape cartridge received in tunnel 30.

Figure 4:
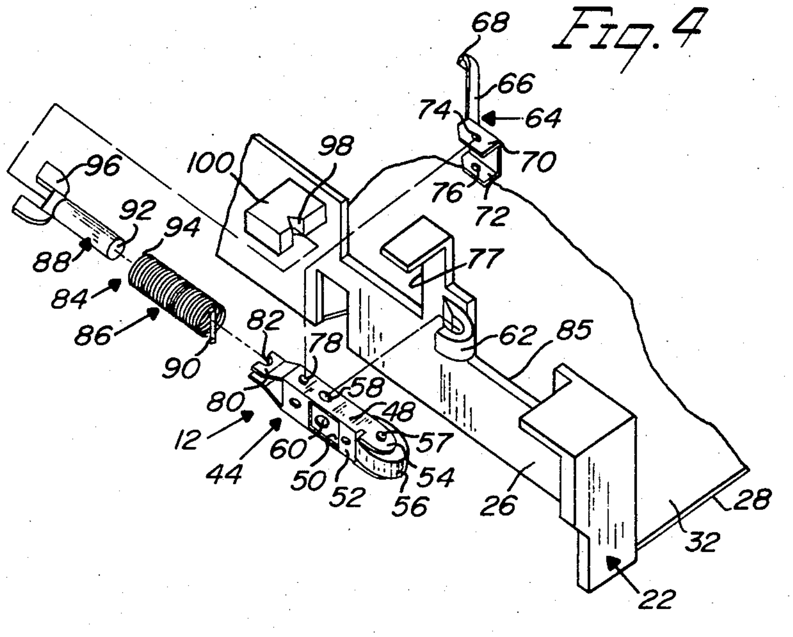
FIG. 4 is an exploded, fragmentary, isometric view of the cartridge locking mechanism and cartridge tape player housing, illustrating the assembly of the former with the latter.

Referring now to FIG. 4 of the drawings, it can be seen that the cartridge locking mechanism 12 includes an arm member 44 formed of a single piece of stamped metal and has first and second opposing side walls 48, 50 joined by a third wall 52. The two walls 48, 50 each include a tab, such as 54 of wall 48, at a free end thereof to accommodate a roller 56 mounted for rotation therebetween on a pin 57 extending through the tabs and roller. A pair of opposing projections 58, 60 are punched from the walls 48, 50, respectively, near the center of arm 44 and extend inwardly toward each other. The projections 58, 60 enable the roller carrying arm member 44 to be mounted for pivotal movement on side wall 26 of the chassis. The projections are received in a hook or U-shaped mounting post 62 formed integrally with and extending from side wall 26 of the chassis. At the opposite free end 80 of arm 44, the walls 48, 50 are bent to be adjacent each other and a cutout 82 is formed therein.

A leaf spring actuator assembly 64 includes a leaf spring actuator arm 66 with a free end 68 curved back on itself for sliding engagement with the side wall of a cartridge received in tunnel 30. The opposite end of the leaf spring actuator assembly is bent to form a pair of opposing side walls 70, 72 each having an aperture 74, 76 respectively, therein. The assembly is snapped over the roller arm 44 so that projections, such as 78, protruding outwardly from walls 48, 50 of arm 44, extend through apertures 74, 76 respectively, to attach the actuator assembly to the roller arm. When arm member 44 is mounted on wall 26 as described heretofore, the leaf spring arm 66 extends into tunnel 30 through an opening 77 in wall 26.

A snapover spring arrangement 84 including a relatively heavy gauge coil spring 86 and an insert pin 88, is connected at the end 80 of arm 44. A first end 90 of the coil spring is bent so as to extend across the central opening in the spring and is received in the cutout 82. A first end 92 of the insert pin is received in the free end 94 of coil spring 86 for axial movement therein. The opposite end 96 of pin 88 has the shape of a fork for receipt in notch 98 of a second mounting post 100 formed along wall 26 of chassis 22 in opposing relation to mounting post 62.

When assembled as described, coil spring 86 is placed under tension and by the pivotal movement of arm 44 about mounting post 62, spring 86 is capable of snapping arm 44 into two stable or snapover positions.

It should be noted that the assembly of the cartridge locking mechanism 12 on the tape player chassis 22 requires no separate fastening devices. Through the use of coil spring 86 only, the locking mechanism 12 is easily mounted for use on the wall 26 of the player.

For purposes of affording a more complete understanding of the invention, it is advantageous now to provide a functional description of the mode in which the component parts thus far described cooperate.

Referring to FIG. 1, the cartridge 14 is shown being inserted in the direction of the arrow, into open end 32 of cartridge receiving tunnel 30. Initially, the leading, inclined portion 21 of side wall 20 of the cartridge engages the leaf spring actuator arm 66 of actuator assembly 64. Leaf spring 66 rides along and is deflected or is loaded by cartridge 20 as the cartridge continues to be inserted into tunnel 30 toward the tape playing and driving instrumentalities. Prior to or by the time the end 68 of spring 66 passes the inclined section 21 of side wall 20, the force provided by the spring pivots arm 44 about mounting post 62 sufficiently to move roller 56 into engagement with side wall 20 of cartridge 14. Likewise, the pin 88 pivots at forked end 96 thereof about mounting post 100.

Figure 3:
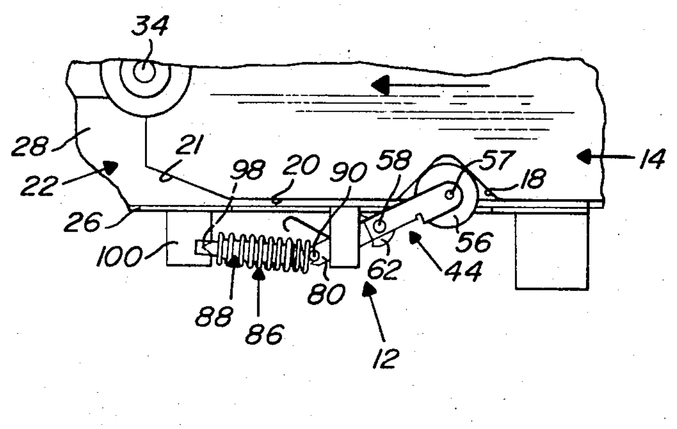

Further insertion of the cartridge into tunnel 30 causes roller 56 to enter notch 18 in side wall 20. At this time, arm 44 is pivoted sufficiently to cause the bistable spring 86 to snap overcenter to its second stable state (see FIG. 3), forcing roller 56 into notch 18 in side wall 20 of the cartridge. In fact, the cartridge need only be inserted to the point of initial entry of the roller 56 into groove 18, since the force of snapover spring 86 at that time is sufficient to move the roller into notch 18 of the cartridge thereby to move the latter to a fully inserted position in tunnel 30 with the tape in engagement with the playing and driving instrumentalities. Once fully inserted, the cartridge is maintained in tunnel 30 by locking mechanism 12.

Withdrawal of cartridge 14 from tunnel 30 forces roller 56 from notch 18 and pivots arm 44 about post 62. Roller 56 rolls along side wall 20 and leaf spring arm 66 slides therealong as well, until the last-mentioned arm is relaxed sufficiently to permit arm 44 to be pivoted in an opposite direction about mounting post 62 to cause bistable spring 86 to snap over from the second to the first stable state, returning the arm 44 and roller 56 to their initial positions (FIG. 1).

Thus, the cartridge locking mechanism according to the invention provides an efficient means for positively securing a tape cartridge in a tape player. The mechanism includes relatively few parts which are easily assembled on mounting posts provided on the side wall of the player housing or chassis. No separate fastener devices such as screws, pins, rivets or the like are required to mount the mechanism in an operational position on a tape player chassis. Each part is fabricated to be easily coupled, and all of the joined parts are held together in position by the coil spring member which is used as a snapover spring as well during the operation of the mechanism. Because of the easy assembly of the locking mechanism, manufacturing costs are reduced and assembly time is lessened considerably.

While a particular embodiment of the invention has been shown and described, the invention is not limited thereto since many modifications thereof can be made. It is therefore contemplated to cover by the present application any and all such modifications as fall within the true spirit and scope of the appended claims.

I claim:

1. A tape player for playing a tape cartridge having a recording tape mounted for movement therethrough, said player including a tunnel for receiving said cartridge, means engageable with said tape for driving the latter through the cartridge when the cartridge is inserted fully into the tunnel, a magnetic tape head also engageable with said tape when the cartridge is in the fully inserted position and a cartridge locking mechanism for removably securing said cartridge in said tunnel, said mechanism including in combination;

an overcenter spring arrangement movable between first and second stable states, cartridge retaining means coupled to said overcenter spring arrangement including an arm mounted for pivotal movement from a first position to a second position whereat said arm passes into said tunnel into engagement with the cartridge and actuator means connected to said arm and extending into said tunnel in the path of a cartridge received therein, said actuator means including a resilient member coupled to said arm and extending into said tunnel and being mounted for gradual deflection by the insertion of a cartridge into said tunnel to move said overcenter spring arrangement from said first to said second stable state, and to pivot said arm from said first to said second position so that said one end of said arm engages said cartridge to retain the latter in a fully inserted position in said tunnel.

2 A tape player as claimed in claim 1 wherein said cartridge includes a notch formed in a side wall thereof and wherein said arm of said cartridge locking mechanism includes a roller mounted at a first end thereof for movement into said tunnel in engagement with said side wall and for receipt in said notch.

3. A tape player as claimed in claim 2 wherein the leading end portion of a side wall of said cartridge is inclined so that upon insertion of said cartridge into said tunnel, said resilient member initially engages and rides along said inclined portion until engaging a relatively flat side wall portion of the cartridge, to pivot said arm sufficiently to move said overcenter spring arrangement from said first to said second stable state, thereby to move the roller into the notch in said cartridge wall.

4. A tape player as claimed in claim 1 further including first and second spaced mounting posts extending from a side wall thereof adjacent said cartridge receiving tunnel, said cartridge retaining arm being mounted for pivotal movement on said first mounting post, and wherein said overcenter spring arrangement includes a tensioned spring member mounted between a first end of said cartridge retaining arm and said second mounting post, said spring securing said cartridge retaining arm in a mounted position on said side wall and providing the necessary force to actuate said arm between the first and second positions.

5. A tape player as claimed in claim 4 wherein said overcenter spring arrangement includes a coil spring and pin inserted at one end thereinto for movement axially with respect thereto, the other free end of said pin being pivotally coupled to said second mounting post and said coil spring being coupled pivotally to the free end of said cartridge retaining arm.

6. A cartridge locking mechanism for a tape player having a chassis defining a tunnel for receiving a tape cartridge, one of the side walls of said chassis having a pair of spaced mounting posts provided thereon and instrumentalities for driving and playing a recording tape in the cartridge upon insertion of the latter into said tunnel, said locking mechanism including in combination; an arm having cartridge retaining means, mounted for pivotal movement on a first one of said mounting posts, said arm being movable between a first position whereat said cartridge retaining means is positioned outside of said tunnel and a second position whereat said cartridge retaining means is positioned within said tunnel in engagement with a cartridge inserted thereinto, bistable spring means mounted between said other mounting post and said pivotal arm, said spring means being under tension to provide a predetermined force against said pivotal arm for retaining said arm in a mounted position on said first mounting post and for moving said arm between said first and second positions in response to the insertion of a tape cartridge into said tunnel, and actuator means coupled to said arm and extending into said cartridge receiving tunnel in the path of a cartridge received therein for engagement therewith, said actuator means including a resilient member coupled to said arm and being mounted for gradual deflection by the insertion of a cartridge into said tunnel to move said bistable spring means from said first to said second stable state, and to pivot said arm from said first to said second position with said cartridge retaining means in engagement with said cartridge to retain the latter in a fully inserted position in said tunnel.

7. A cartridge locking mechanism as claimed in claim 6 wherein said cartridge retaining means include a roller mounted for rotation on a first end of said arm and wherein said bistable spring means include a coil spring member and a pin inserted into one end thereof for axial movement therein, said pin being coupled to said other mounting post for pivotal movement with respect thereto and the opposite end of said spring engaging the opposite end of said arm, whereby the force provided by said coil spring retains said assembly mounted between said mounting posts on said side wall.

8. A cartridge locking mechanism as claimed in claim 6 wherein said actuator means include a resilient arm coupled to said pivotal arm, said resilient arm being deflected by said cartridge in response to the insertion of the latter into said tunnel, said bistable spring means being actuated from said first to said second stable state upon said resilient arm being predeterminedly deflected by said cartridge.

9. A cartridge locking mechanism as claimed in claim 8 wherein said cartridge includes an inclined portion along a side wall near the leading end thereof, said resilient arm engaging and riding along said inclined portion upon initially inserting said cartridge into said tunnel and gradually being bent as said cartridge continues to be inserted into said tunnel, whereby, upon bending said resilient arm sufficiently, said overcenter spring arrangement is moved from said first to said second stable state, and wherein said cartridge side wall includes a notch formed therein for receipt of said roller upon insertion of said cartridge fully into said tunnel.

10. A cartridge locking mechanism for a tape player having an open ended tunnel for receiving a tape cartridge and instrumentalities for driving and playing a recording tape in the cartridge upon insertion of the latter into the tunnel, said player also including a side wall having a pair of spaced mounting posts provided thereon, said cartridge locking mechanism including in combination; an arm member carrying a roller on a first end thereof, said arm member coupled to a first one of said mounting posts for pivotal movement between a first position whereat said roller is positioned outside of said cartridge receiving tunnel and a second position whereat said roller is moved into said tunnel for engagement with a cartridge received therein, bistable means including a coil spring and pin inserted thereinto for movement axially with respect thereto, said pin being pivotally engaged with respect to said other mounting post and the free end of said coil spring coupled pivotally to the other free end of said arm member, said spring being tensioned to maintain said arm and pin in mounted positions on said respective mounting posts as well as to maintain said bistable means in first and second stable states, respectively, and a leaf spring actuator attached to said roller arm and extending into said cartridge receiving tunnel in the path of a cartridge, said actuator arm being deflected by a cartridge inserted into said tunnel and moving said bistable means from said first to said second stable state whereby said arm is pivoted from said first to said second position to maintain said cartridge in a fully inserted position in said player.

11. A cartridge locking mechanism as claimed in claim 10 wherein said cartridge includes an inclined side wall portion near the leading end thereof for deflecting, gradually, said leaf spring actuator upon insertion of said cartridge into said tunnel, and a notch formed in said side wall for receipt of said roller upon insertion of said cartridge fully into said tunnel, said roller being forced from said notch upon withdrawal of said cartridge from said tunnel to move said bistable means from said second to said first stable state, whereby said arm is maintained outside of said tunnel.

12. A cartridge locking mechanism as claimed in claim 11 wherein said mounting posts each include a notch formed therein, wherein said arm member includes a pair of opposing projections formed thereon, said projections being received by the notch of the first one of said mounting posts, thereby to mount said arm pivotally on said mounting post, wherein the free end of said pin is shaped for mating engagement with said second mounting post in said notch and wherein said coil spring provides sufficient force against said pin and said arm to maintain each in pivotal engagement with a respective mounting post.

13. A cartridge locking mechanism as claimed in claim 12 wherein said leaf spring actuator includes an end portion having opposing walls spaced for snap-on engagement with said pivotal arm.

* * * * *